(12) United States Patent
Yang et al.

(10) Patent No.: US 8,437,733 B2
(45) Date of Patent: May 7, 2013

(54) MOBILE TERMINAL FOR IMPLEMENTING MONITORING MANAGEMENT AND MONITORING IMPLEMENTATION METHOD THEREOF

(75) Inventors: Chen Yang, Shenzhen (CN); Cuirong Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/496,612

(22) PCT Filed: Apr. 2, 2010

(86) PCT No.: PCT/CN2010/071548
§ 371 (c)(1),
(2), (4) Date: Mar. 16, 2012

(87) PCT Pub. No.: WO2011/032377
PCT Pub. Date: Mar. 24, 2011

(65) Prior Publication Data
US 2012/0178409 A1  Jul. 12, 2012

(30) Foreign Application Priority Data
Sep. 21, 2009  (CN) .......................... 2009 1 0093424

(51) Int. Cl.
*H04W 4/22* (2009.01)
*H04M 11/04* (2006.01)

(52) U.S. Cl.
USPC ...................................................... 455/404.1

(58) Field of Classification Search ........................ None
See application file for complete search history.

(56) References Cited

U.S. PATENT DOCUMENTS

| | | | | |
|---|---|---|---|---|
| 6,281,987 | B1 * | 8/2001 | Yoshida | 358/434 |
| 7,844,247 | B2 * | 11/2010 | Chen et al. | 455/404.1 |
| 8,075,499 | B2 * | 12/2011 | Nathan et al. | 600/587 |
| 2002/0151297 | A1 * | 10/2002 | Remboski et al. | 455/414 |

(Continued)

FOREIGN PATENT DOCUMENTS

| | | |
|---|---|---|
| CN | 1585433 A | 2/2005 |
| CN | 101102594 A | 1/2008 |

(Continued)

OTHER PUBLICATIONS

International Search Report for PCT/CN2010/071548 dated Jun. 23, 2010.

*Primary Examiner* — Marcos Batista
*Assistant Examiner* — Frank Donado
(74) *Attorney, Agent, or Firm* — Ling Wu; Stephen Yang; Ling and Yang Intellectual Property

(57) ABSTRACT

A mobile terminal for implementing monitoring management is disclosed in the present invention. The mobile terminal includes a user danger level monitoring platform configured to adapt to a monitored current situation of a user, enable a corresponding danger level and take a corresponding rescue measure. A method for implementing monitoring management is also disclosed in the present invention. The method includes adapting to a monitored current situation of a user, enabling a corresponding danger level and taking a corresponding rescue measure. With the mobile terminal and the method of the present invention, it is possible to monitor the user request for help in real time and to take the corresponding rescue measures in time according to the different needs faced by the user, and win the rescue time.

7 Claims, 5 Drawing Sheets

U.S. PATENT DOCUMENTS

| | | | |
|---|---|---|---|
| 2007/0066276 A1* | 3/2007 | Kuz et al. | 455/404.1 |
| 2007/0254623 A1* | 11/2007 | Branda et al. | 455/404.1 |
| 2008/0133277 A1* | 6/2008 | Jang et al. | 705/3 |
| 2008/0242261 A1* | 10/2008 | Shimanuki et al. | 455/404.2 |
| 2010/0048167 A1* | 2/2010 | Chow et al. | 455/410 |
| 2010/0151814 A1* | 6/2010 | Bragg | 455/404.2 |
| 2010/0217533 A1* | 8/2010 | Nadkarni et al. | 702/19 |
| 2010/0285771 A1* | 11/2010 | Peabody | 455/404.2 |
| 2011/0028118 A1* | 2/2011 | Thomas | 455/404.1 |
| 2011/0034147 A1* | 2/2011 | Issa et al. | 455/410 |
| 2011/0130112 A1* | 6/2011 | Saigh et al. | 455/404.1 |

FOREIGN PATENT DOCUMENTS

| | | |
|---|---|---|
| CN | 101159935 A | 4/2008 |
| CN | 101668069 A | 3/2010 |
| JP | 2009152724 A | 7/2009 |

* cited by examiner

MOBILE TERMINAL FOR IMPLEMENTING MONITORING MANAGEMENT AND MONITORING IMPLEMENTATION METHOD THEREOF

TECHNICAL FIELD

The present invention relates to the field of electronics and communications, and more particularly, to a mobile terminal for implementing monitoring management and a method for implementing monitoring thereof.

BACKGROUND OF THE RELATED ART

At present, various mobile terminals have become one of the commonly used communication tools in the daily lives of people. The mobile terminals being mobile phones is taken as an example, and the mobile phones are designed with different styles for different crowds. Accompanied by the arrival of an aging society, there are endless mobile phone designs suitable for the elderly. With simplified mobile phone menu functions as well as oversize key screen-printing and the ring volume and so on, the mobile phones are more suitable for older people. However, it is not difficult to find that the design of the current cell phones appropriately used by the older people primarily focuses on aspects such as operation simplicity, function practicality and use friendly but it does not have enough considerations on aspects such as alarm processing in the case of safety monitoring and emergency.

In order to provide truly love and care for the elderly and remove the worry from their children's busy work, it is very necessary and urgent to provide a complete monitoring so as to carry out rescue measures for the elderly. The mobile phone for the elderly proposed in the Chinese patent application whose application number has 200710075357 simply introduced the alarm module configured to alarm when the mobile phone is in collision so as to turn to the people around it for help. However, this method solely relies on the alarm to attract other people's attentions, but the user is still in a passive waiting state. Moreover, even if a function of automatically dialing a preset number is supplemented, due to the lack of design in the automatic interaction ability, when the user is in special situations, such as when staying alone, and if the user suddenly loses the communication ability, he/she is still unable to obtain rescue in time. According to statistical reports, even if the people is in the most advanced areas of the emergency ambulance facilities, the fastest rescue that the party can obtain usually needs to wait for 5 minutes after the alarm. Therefore, how to perform real-time monitoring for the user requesting for help, take rescue measures in time, and win the rescue time all need to be solved and implemented.

SUMMARY OF THE INVENTION

In view of this, the main object of the present invention is to provide a mobile terminal for implementing monitoring management and a method for implementing monitoring thereof, so as to be able to monitor the user requesting for help in real time, and take the corresponding rescue measures in time according to different needs faced by the user, thereby winning the rescue time.

To achieve the aforementioned object, the technical solution of the present invention is accomplished as follows.

A mobile terminal for implementing monitoring management comprises: a user danger level monitoring platform configured to: adapt to a monitored current situation of a user, enable a corresponding danger level, and take a corresponding rescue measure.

The user danger level monitoring platform comprises: an enabling unit and a platform monitoring operating unit; wherein, the enabling unit is configured to: trigger enabling of the user danger level monitoring platform according to an enabling message received from the user danger level monitoring platform; adapt to the monitored current situation of the user, and enable the corresponding danger level;

the platform monitoring operating unit is configured to: take the corresponding rescue measure according to the enabled danger level.

The user danger level monitoring platform further comprises: a fluctuation detection component configured to: detect a user motion state, and send the enabling message to the enabling unit when the user motion state has a sudden fluctuation exceeding a preset fluctuation threshold;

the enabling unit is further configured to: enable the user danger level monitoring platform; and enable a first danger level when the monitored enabling message is sent from the fluctuation detection component;

the platform monitoring operating unit further comprises: an alarm component configured to: send an alarm signal via a beep or help audio set by the user in the first danger level.

The platform monitoring operating unit further comprises: a first timer component configured to be enabled at same time when enabling the alarm component to allow the user to choose to actively clear the alarm within preset time, and notify the enabling unit to enable a second danger level when the alarm has not been cleared when the preset time arrives.

The user danger level monitoring platform further comprises: a key analysis component configured to analyze a user's key operation, and send the enabling message to the enabling unit when the analyzed user's key operation matches with a set key or key combination;

the enabling unit is further configured to enable said user danger level monitoring platform; and enable the second danger lever when the monitored enabling message is sent by the key analysis component.

In the second danger level, the platform monitoring operating unit further comprises: an automatic dialing-up component configured to: dial a help number set by the user to make a call for help, and automatically establish call interaction with a party who is asked for help.

The platform monitoring operating unit further comprises: a first short message function component, configured to: be enabled at the same time when enabling the automatic dialing-up component, or be enabled when using a polling way to call the help number for help and a call is unable to be established, send a preset help phrase, and establish short message interaction with the party who is asked for help.

The platform monitoring operating unit further comprises: a polling times analyzer and a second timer component; wherein, the polling times analyzer is configured to: count polling times, and notify the second timer component to be enabled in a case that the polling times do not reach the preset threshold;

the second timer component is configured to: be enabled in the case that the polling times do not reach the preset threshold, and notify the automatic dialing-up component to start a new round of automatic dialing-up when set time arrives.

The platform monitoring operating unit further comprises: a second short message function component configured to analyze a short message containing an authentication password from the party who is asked for help after establishing the call interaction but the party who is asked for help does not acquire user response, and when the analyzed password matches a preset danger upgrading password, notify the enabling unit to enable the third danger level;

alternatively, the platform monitoring operating unit further uses the polling times analyzer to count the polling times, and when the polling times reaches the preset threshold, notify the enabling unit to enable the third danger level.

In the third danger level, the platform monitoring operating unit further comprises: a spatial locating component configured to be enabled in a case of re-enabling the alarm component, and send the acquired user's current location to the parties who are asked for help corresponding to the help numbers in group.

A method for implementing monitoring management comprising: adapting to a monitored current location of a user, enabling a corresponding danger level, and taking a corresponding rescue measure.

Before enabling the danger level, the method further comprises: triggering to enable the user danger level monitoring platform according to a received enabling message from the platform.

When the enabling message is not triggered by the user pressing a key, a first danger level is enabled, and the taken rescue measure specifically comprise: an alarm component sending an alarm signal via beep or help audio set by the user.

A first timer component is enabled at same time when enabling the alarm component, the user is allowed to choose to actively clear an alarm within preset time, and in a cast that the alarm has not been cleared triggering to enable the user danger level monitoring platform, or in a case that the enabling message is triggered by the user pressing the key, a second danger level is enabled, and the taken rescue measure specifically comprise: an automatic dialing-up component calling a help number set by the user for help, and automatically establishing call interaction with a party who is asked for help.

The established interaction further comprises: a first short message function component being enabled at same time when enabling the automatic dialing-up component or being enabled when using a polling way to call the help number but a call is unable to be established, sending a preset help phrase, and establishing the short message interaction with the party who is asked for help.

When using the polling way to poll the help number, polling times are further counted, and in a case that the polling times do not reach a preset threshold, a second timer component is notified to be enabled, and when the set time arrives, the automatic dialing-up component is notified to start a new round of automatic dialing-up.

The method further comprises: after establishing the call interaction, a second short message function component analyzing a short message containing an authentication password from the party who is asked for help in a case that the party who is asked for help does not acquire said user response, and when the analyzed password matches with a preset danger upgrading password, enabling a third danger level;

alternatively, the method further comprises: counting the polling times, and when the polling times reach the preset threshold, enabling the third danger level.

In the third danger level, the taken rescue measure comprises: the spatial locating component being enabled in a case of re-enabling the alarm component, and sending the acquired current location of the user to the parties who are asked for help corresponding to the help numbers according to the set help numbers.

The user danger level monitoring platform of the present invention adapts to the monitored current situation of the user, which enables the corresponding danger level and takes the corresponding rescue measures.

The present invention is different from the related art in which only a single alarm for help can be used. The present invention monitors the user's requests for help in real-time, and the corresponding rescue measures are taken in time according to different needs faced by the users and win the rescue time. The present invention is mainly used to improve the implementation of monitoring measures upon the special needs of elderly and sick persons. The present invention can also be extended to the use of special sick care.

PREFERRED EMBODIMENTS OF THE PRESENT INVENTION

Figure 1:
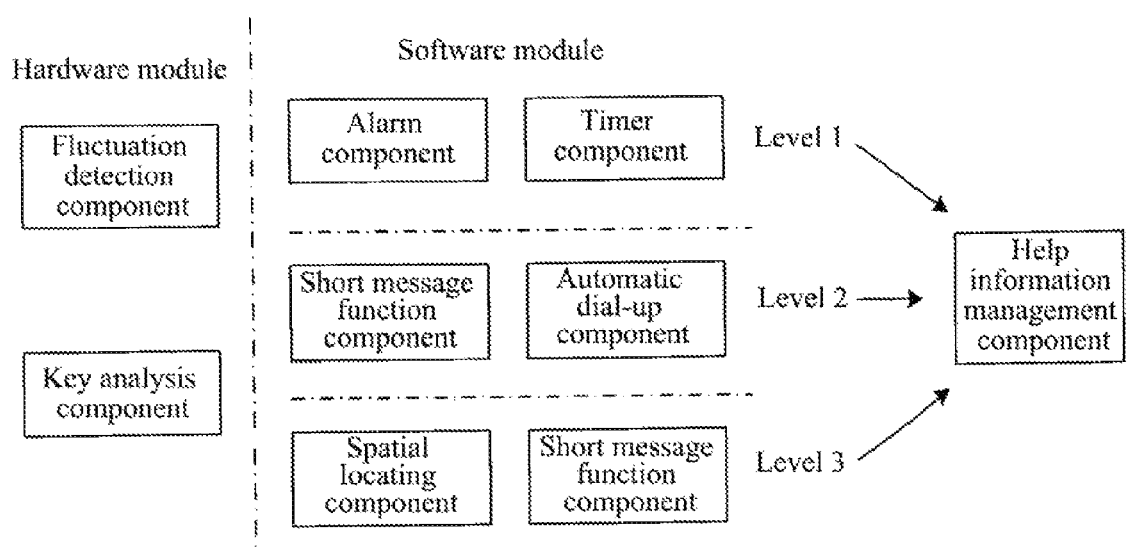
FIG. 1 is a structural diagram of a user's danger level monitoring platform.

The basic idea of the present invention is to adapt to the monitored current situation of the user, enable the corresponding danger level, and take the corresponding rescue measures.

In the following, the implementation of the technical scheme of the present invention will be further described in detail with combination of the accompanying figures.

A mobile terminal for implementing monitoring management comprises: a user danger level monitoring platform configured to adapt to the monitored current situation of the user, enable the corresponding danger level, and take the corresponding rescue measures.

Here, the user danger level monitoring platform comprises: an enabling unit and a platform monitoring operating unit, wherein the enabling unit is configured to trigger the enabling of the platform according to the received enabling message of the user danger level monitoring platform; adapt to the monitored current situation of the user, and enable the corresponding danger level. The platform monitoring operating unit is configured to take the corresponding rescue measures according to the enabled danger level.

It should be noted that the user danger level monitoring platform is not enabled until receiving the enabling message sent by the user itself pressing the keys or sent by the fluctuation detection component, and those will be described respectively in the following.

The first scenario is a scenario that the fluctuation detection component sends the enabling message.

At this point, the user danger level monitoring platform further comprises a fluctuation detection component configured to detect the user motion state, and send an enabling message to the enabling unit when the user motion state has a sudden fluctuation beyond the set fluctuation threshold. The enabling unit is further configured to enable the platform; and enable the first danger lever when monitoring that the enabling message is sent by the fluctuation detection component, that is: the enabling message is not triggered by the user pressing the keys. The platform monitoring operating unit further comprises an alarm component configured to send an alarm signal through a beep or help audio set by the user in the case that it is in the first danger level.

Herein, in order to avoid the mistake operation and the need of screening the danger levels, the platform monitoring operating unit further comprises the first timer component configured to be enabled at the same time when enabling the alarm component, so as to allow the user to select to actively clear the alarm within the set time, and notify the enabling unit to enable the second danger level if the alarm is still not cleared when the set time arrives.

The second scenario is a scenario that the user itself presses the keys to send the enabling message.

At this point, the user danger level monitoring platform further comprises a key analysis component for analyzing the user's key operation, and send an enabling message to the enabling unit when the analyzed user's key operation matches with the set key or key combination. The enabling unit is further configured to enable the platform; and enable the second danger level when monitoring that the enabling message is sent by the key analysis component, namely: the enabling message is triggered by the user pressing the keys.

Based on the above two scenarios, in the case of being in the second danger level, the platform monitoring operating unit further comprises an automatic dialing-up component configured to call the help numbers set by the user for help, and automatically establish the call interaction with the help-seeking party.

Here, in order to enhance the automatic interaction capability between the user as the party who is asked for help and the help-seeking party, the platform monitoring operating unit might further comprise an auxiliary component, i.e., the first short message functional component. and which is configured to be enabled at the same time when enabling the automatic dialing-up component, or use the polling way to call the help numbers for help and be enabled in the case that the call cannot be established, send the set help phrase, and establish the short message interaction with the helping-seek party.

Here, in order to avoid the battery consumption due to the repeated polling, the platform monitoring operating unit further comprises: a polling times analyzer and a second timer component, wherein the polling times analyzer is configured to count the polling times, and notify the second timer component to be enabled when the polling times do not reach the set threshold. The second timer component is configured to be enabled when the polling times do not reach the set threshold, and notify the automatic dialing-up component to start a new round of automatic dialing-up when the set time arrives.

Here, when the platform monitoring operating unit is in the second danger level, it will be automatically upgraded to the third danger level in the following two cases.

The first case is that the platform monitoring operating unit further comprises a second short message functional component configured to analyze the short message containing the authentication password from the helping-seeking party after establishing the call interaction and in the case that the help-seeking party does not receive the response from the user itself, and notify the enabling unit to enable the third danger level when the analyzed password matches with the set danger upgrading password. The second case is that the platform monitoring operating unit further comprises a polling times analyzer configured to count the polling times, and notify the enabling unit to enable the third danger level in the case that the polling times reach the set threshold.

Here, when being in the third danger level, the platform monitoring operating unit further comprises a spatial locating component configured to be enabled in the case of re-enabling the alarm component, and send the acquired current location of the user to the parties who are asked for help corresponding to the help numbers in group according to the set help numbers.

Herein, the aforementioned help numbers, help phrases, and help audios are maintained by the rescue information management component.

A method for implementing monitoring management comprises: adapting to the monitored current situation of the user, enabling the corresponding danger level, and taking the corresponding rescue measures.

Herein, before enabling the danger level, the method also comprises: triggering the enabling of the user danger level monitoring platform according to the received enabling message of the user danger level monitoring platform.

It should be noted that the user danger level monitoring platform needs to judge the source of the received enabling message, that is, judge whether the enabling message is triggered by the user pressing the keys or not, and performs different processing according to different judgment results, which will be described respectively in the following.

The first scenario is the scenario that the enabling message is not triggered by the user pressing the keys. At this point, the first danger level is enabled and the taken rescue measures specifically comprise: the alarm component sending an alarm signal through a beep or help audio set by the user.

Herein, the first timer component is enabled at the same time when enabling the alarm component, and the user is allowed to select to actively clear the alarm within the set time. If the alarm is not cleared when the set time arrives, the second danger level is enabled.

The second scenario is a scenario that the enabling message is triggered by the user pressing the keys, and at this point, the second danger level is enabled.

Based on the above two scenarios, in the case of being in the second danger level, the taken rescue measures specifically comprise: the automatic dialing-up component calling the help numbers set by the user for help, and automatically establishing the call interaction with the party who is asked for help.

Herein, in order to enhance the automatic interaction capability, the established interaction further comprises: enabling the first short message functional component at the same time when enabling the automatic dialing-up component, or enabling the first short message functional component when using the polling way to call the help numbers but the call cannot be established, sending the set help phrase and establishing the short message interaction with the help-seeking party.

Here, in order to avoid the power consumption in repeated polling, when using the polling way to perform polling on the help numbers, the polling times are further counted, and in the case that the polling times do not reach the set threshold, the second timer component is notified to be enabled, and when the set time arrives, the automatic dialing-up component is notified to start a new round of automatic dialing-up.

Here, when being in the second danger level, it will automatically upgrade to the third danger level in the following two cases.

The first case is that the second short message functional component analyzes the short message containing the authentication password from the help-seeking party after establishing the call interaction and in the case that the help-seeking side does not receive the response from the user, and when the analyzed password matches with the set danger upgrading password, enables the third danger level. The second case is to enable the third danger level when counting the polling times and when the polling times reach the set threshold.

When being in the third danger level, the taken rescue measures specifically comprise: enabling the spatial locating component when re-enabling the alarm component, and sending the acquired current location of the user to the help-seeking parties corresponding to the help numbers in group according to the set help numbers.

In the following, the main content of the present invention will be described.

The main object of the present invention is to achieve a safe and effective monitoring function in the mobile terminal. The construction method is to introduce a user danger level monitoring platform into the mobile terminal system. As shown in FIG. 1, taking the mobile phones as an example of mobile terminals, the platform introduced in the mobile phone system comprises the software module and the hardware module. The hardware module is mainly achieved by adding a fluctuation detection component and a key analysis component of the user; the software module mainly comprises an alarm component, timer components comprising the first and second timer components, a rescue information management component, an automatic dialing-up component, the first short message functional component, the second short message functional component and a spatial locating component.

As shown in FIG. 1, the fluctuation detection component uses the mobile phone's portability and personal nature, and monitors the user motion state in real-time. Whenever the sudden fluctuation happening in the user action exceeds a preset threshold, the instrument will automatically trigger the alarm component in the software module to send an alarm signal. Meanwhile, in order to ensure that a rescue request can be sent as soon as possible when the user feels uncomfortable, the platform also adds a key analysis component. For example, when long pressing the specified key or key combination, the danger level monitoring platform is directly enabled.

The alarm component is triggered by the alarm information from the hardware module, and sends an alarm via a mobile phone speaker; the timer component and the alarm component are used in combination, and are configured to determine the user current stayed danger level; the automatic dialing-up component and the first and second short message analysis components invoke the rescue information management component, and combine with the spatial locating component to extend and achieve the automatic interaction capability of the danger level monitoring system, so as to ensure the effective communication between the user and help-seeking object. Herein, it should be noted that the alarm modules in the present invention and that in the related art are different, wherein the alarm module in the present invention is not singly dependent on the rescue measure of the alarm, and the user danger level monitoring platform introduced in the present invention takes full advantage of the spatial locating technology and short messaging functions, and adds the automatic interaction capability between the users as the help-seeking party and the party who is asked for help.

In the platform, the user danger level is initially divided into three levels: the first danger level (LEVEL1), the second danger level (LEVEL2) and the third danger level (LEVEL3), which respectively identify the danger level increasing one by one from low to high. Depending on the actual situation, the danger level can also be divided into more levels.

In the following, the rescue measures taken by the platform in each level will be specifically addressed.

1. After a sudden fluctuation beyond the fluctuation threshold happens, the user enters into LEVEL1, and the whole danger level monitoring platform enters into the monitoring operation state. At this point, the alarm component uses beep or help audio preset by the user to send an emergency call. Considering that the alarm might be enabled caused by actions of the user such as operation mistakes, or accidental drops of the mobile phone and so on in the process of using the mobile phone, the software module adds a timer component, for example the first timer component acting as the alarm timer, and the first timer component is enabled at the same time when enabling the alarm component. In this way, a certain period is reserved for the user to choose to actively clear the alarm, so as to exclude the accidental alarm in the non danger state, thereby avoiding the subsequently unnecessary alarm processing.

2. If the first timer is not processed in time in the preset period of the first timer, it considers that the user is in the danger state that rescue cannot be acquired at this moment, and the whole monitoring platform automatically upgrades the danger level to LEVEL2. At the same time, the main object of introducing the LEVEL1 is to screen and determine the danger environment, and therefore, when the user feels uncomfortable, he/she can press the keys to enable to monitor the state of platform so as to directly enter into the LEVEL2. At this stage, the monitoring platform can use the automatic dialing-up component to call the preset numbers maintained by the help information management component for help, and the preset numbers might be friend & family numbers, or guardian numbers, and so on. To avoid the situation that the call from the person seeking for help is missed, the automatic dialing-up component needs poll the entire preset number list of persons seeking for help in this stage, it also cooperates with the short message component, for example, the first short message functional component sends the preset help phrase to the currently locked help-seeking numbers to specify the emergency of the current call. In this way, after establishing the call, the two parties can talk directly to be fully aware of the current situation of the user so as to implement the further help.

3. After the call is established, if the party who is asked for help found it is impossible to obtain the user's own response, and the short message can be used to send the preset password to the mobile phone asking for help after analyzing and judging the actual situation and upgrade the danger level of the monitoring system. If it is already in the LEVEL2 or above currently, the short message component in the software module, e.g., the second short message function component acting as the short message analysis component, analyzes the received short message content. If it coincides with the preset password, the danger level is automatically upgraded to the LEVEL3. At this point, the alarm component will be enabled again, and at the same time, the spatial locating component acquires the current location and sends to feed the current location back to the preset number list in group. In this way, the other party can use the effective way to carry out rescue based on the received position.

In summary, the present invention is implemented by embedding the user danger level monitoring platform in the common mobile terminal system. The design and implementation of the user danger level monitoring platform of the present invention are based on refining the various complicated emergency situations that might occur into a plurality of different LEVELs by monitoring the abnormal behavior of the users and analyzing the response of the user, and taking the corresponding alarm measures. The combination of automatically dialing the number, the short message function and spatial locating technology enhances the self-interaction capability of the whole monitoring system. At the same time, the system uses the component-based design idea to reduce the coupling degree with other modules in the mobile terminal software, so that its development and maintenance are simple, thereby ensuring the stable implementation of the entire system. The present invention fully considers a variety of needs faced by the user, and it provides the complete and effective monitoring measures.

It should be noted that the whole monitoring platform is usually enabled after receiving the enabling message sent by the user pressing the keys or sent by the fluctuation detection component. The enabling message is a triggering message for enabling the platform. In other words, the fluctuation detection component and the key analysis component in the current hardware module is the entrance for triggering the system. At present, the enabling message sent to the software module is based on the alarm threshold of the fluctuation detection component, or the analysis results from the key analysis component. As the monitoring mobile terminal prompted to the sick for use, various micro physical sign monitoring instruments and sensors can also be added in the hardware module. Such as the heart rhythm monitor for heart disease patients, once the heart level index exceeds the normal index, the monitoring system will be enabled to enter a warning state.

The software module will be based on the security level LEVEL1~LEVEL3 in which the system currently is to use different component combinations to provide the corresponding processing measures. At the same time when ensuring that users get help in time, a variety of triggering conditions is screened to avoid the information mistake transmission as much as possible.

Hereinafter, the present invention will be illustrated.

EXAMPLE 1

Figure 2:
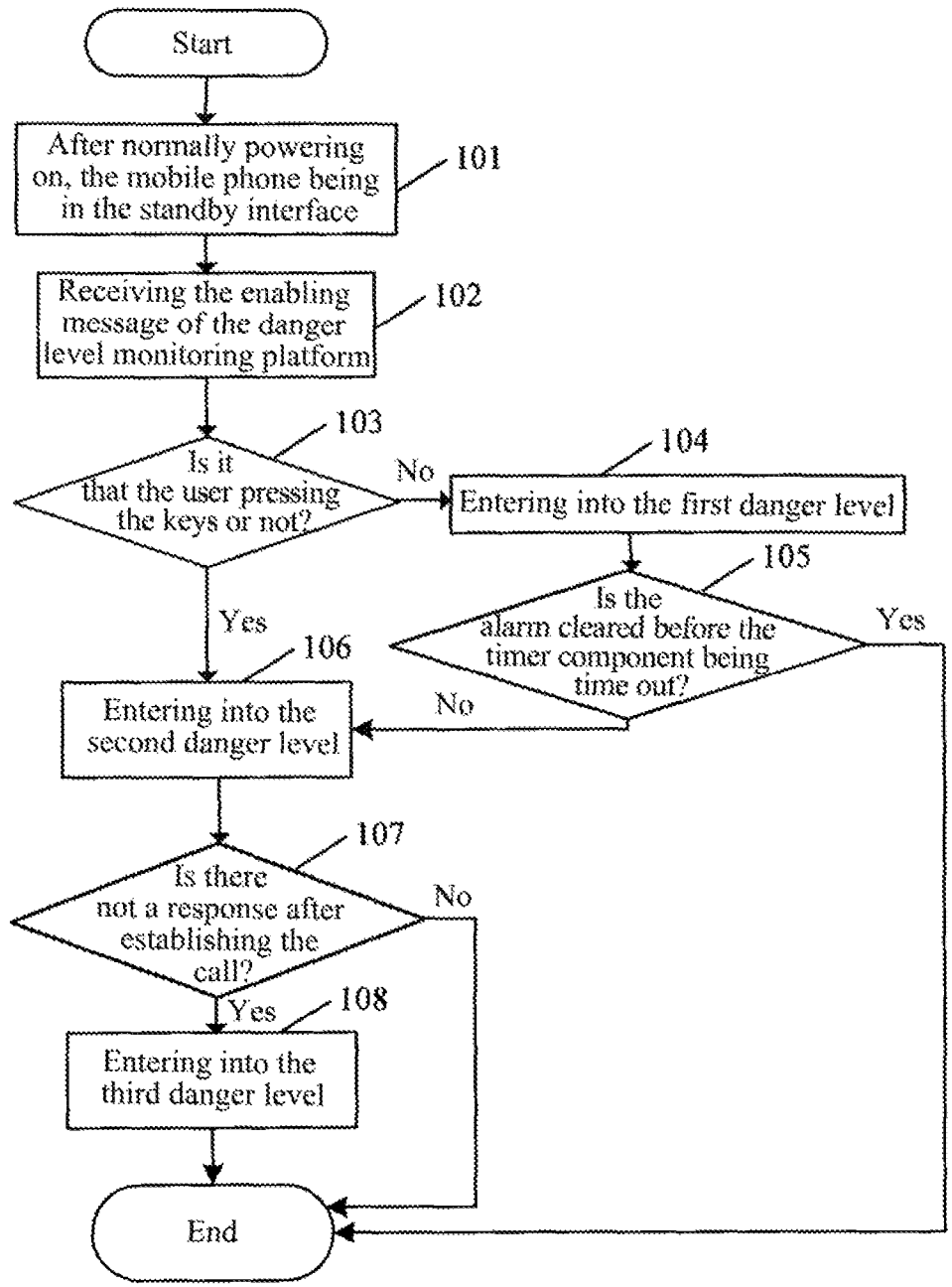
FIG. 2 is a flow chart of switching the levels of a user danger level monitoring platform.

FIG. 2 shows the conditions and procedure of switching among various danger levels in the user danger level monitoring system. Taking the mobile phone as an example of the mobile terminal, the specific implementation is as follows beginning from the mobile phone switching on and entering into the standby interface.

In step 101, the mobile phone is switched on, enters into the standby interface, and normally monitors and processes various network side messages and key messages.

In step 102, the received message is the enabling message of the user danger level monitoring platform.

In step 103, the source of this enabling message is judged, and if the message is the user pressing the keys triggering, such as long pressing the * key, step 106 is performed; otherwise step 104 is performed.

In step 104, LEVEL1 is entered, and simultaneously the alarm and timer components in the enabling module are enabled at this point, and messages are monitored.

In step 105, if the alarm is requested to be cleared before the timer component is timeout, it considers that the user is out of danger, the timer component is switched off and the warning state exits, and the current process ends.

If the timer component timeout message is received, that is, before the timer component is timeout, the alarm is still not requested to be cleared, then it indicates that the user does not receive response and rescue in time in the specified period, and the danger level is updated to LEVEL2, and step 106 is performed to enable the self-interactive communication, rather than passively waiting for rescue.

In step 106, at this point, the danger level of the whole monitoring platform is upgraded to LEVEL2. Since direct talking can make both parties clearly communicate about the situation and needs, and therefore, at this stage, the platform polls the help number list maintained by the help information management component, to perform automatic dialing-up for help. Meanwhile, in order to facilitate the help-seeking person to faster and better specify the emergency degree of the incoming call, before the automatic dialing-up, it also sends a preset help message to the currently locked help number. In order to avoid the power consumption amount caused by the repeat polling, counting the polling times (count) is increased at the same time. If the count value does not reach the threshold times, the timer component is enabled; after waiting for a proper period, a new round of automatic dialing-up starts. If the count counting is full, the system will not continue to poll any more, but upgrade the danger level of the system to LEVEL3, and step 108 is performed. Therefore, the risk brought by objective reasons such as the missing call can be avoided, and moreover the accuracy of the information transfer can be improved.

In step 107, after establishing the call, if the party who is asked for help finds that the other party cannot respond, it also can use the short message to actively upgrade the danger level of the monitoring system to LEVEL3, that is, the mobile phone in the danger level of LEVEL 2 analyzes the short message content received from the party who is asked for help, and if it matches with the preset danger upgrading password, the system danger index will be upgraded to the highest level of LEVEL3. Step 108 is performed.

In step 108, at this point, the danger level of the monitoring platform is upgraded to LEVEL3. The alarm component will be enabled again, and the user's current location information is captured with the spatial locating component, and the information is sent to the preset number list in group. Thus, the person who is asked for help can take the most reasonable and effective rescue measures based on the current environment.

EXAMPLE 2

Figure 3:
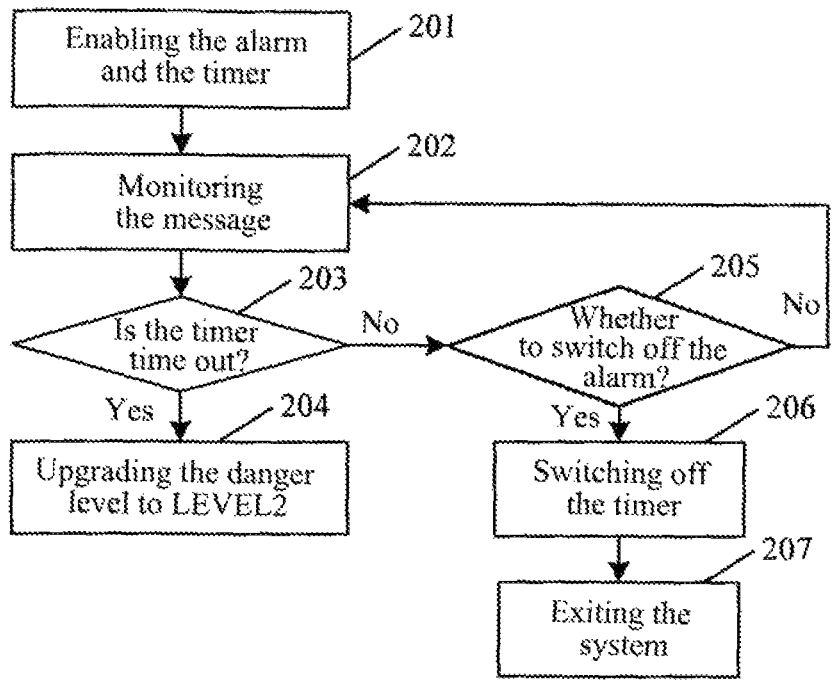
FIG. 3 is a flow chart of one of level processing by the user danger level monitoring platform.

The processing procedure in the danger level of LEVEL1 is shown in FIG. 3 and comprises the following steps.

In step 201, the alarm component and the timer component are enabled.

In step 202, the timer component timeout message is monitored.

In step 203, it is judged whether the timer component timeout message is monitored or not, and if yes, step 204 is performed; otherwise step 205 is performed.

In step 204, the danger level is upgraded from LEVEL1 to LEVEL2, and the processing procedure of the current LEVEL 1 is received.

In step 205, it is judged whether to switch off the alarm component or not, and if yes, step 206 is performed; otherwise step 202 is performed.

In step 206, the timer is switched off.

In step 207, the danger level monitoring platform exits.

EXAMPLE 3

Figure 4:
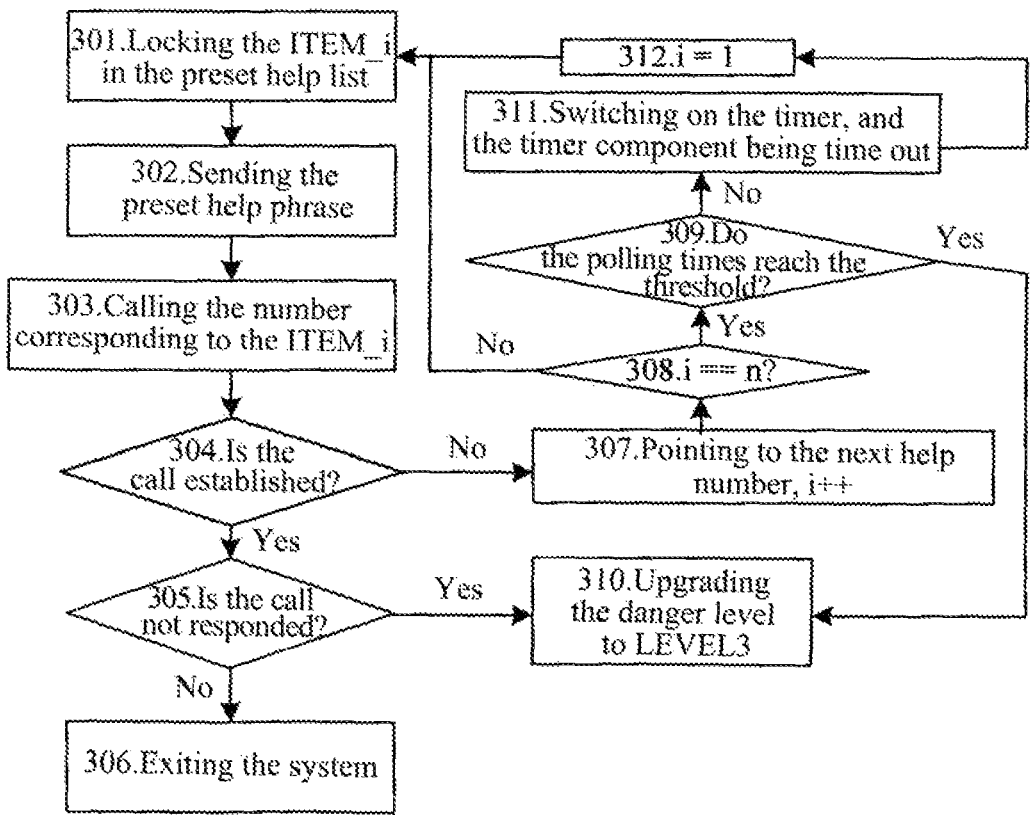
FIG. 4 is a flow chart of another level processing by the user danger level monitoring platform.

The processing procedure at the danger level of LEVEL2 is shown in FIG. 4 and comprises the following steps.

In step 301, the ITEM_i, i=1 . . . n in the preset help list is locked.

In step 302, the preset help phrase is sent.

In step 303, the number corresponding to the ITEM_i is dialed up.

In step 304, it is judged whether the call is established or not, and if yes, step 305 is performed, otherwise step 307 is performed.

In step 305, it is judged whether the call is responded or not, and if yes, step 310 is performed, otherwise, step 306 is performed.

In step 306, the danger level monitoring platform exits.

In step 307, the next help number, i++ is pointed to.

In step 308, it is judged whether i==n or not, and if yes, step 309 is performed; otherwise step 301 is performed.

In step 309, it is judged whether the count reaches the threshold or not, and if yes, step 310 is performed; otherwise step 311 is performed.

In step 311, the timer component is enabled, and when the timer component is timeout, step 312 is performed.

In step 312, when i=1, step 301 is performed.

EXAMPLE 4

Figure 5:
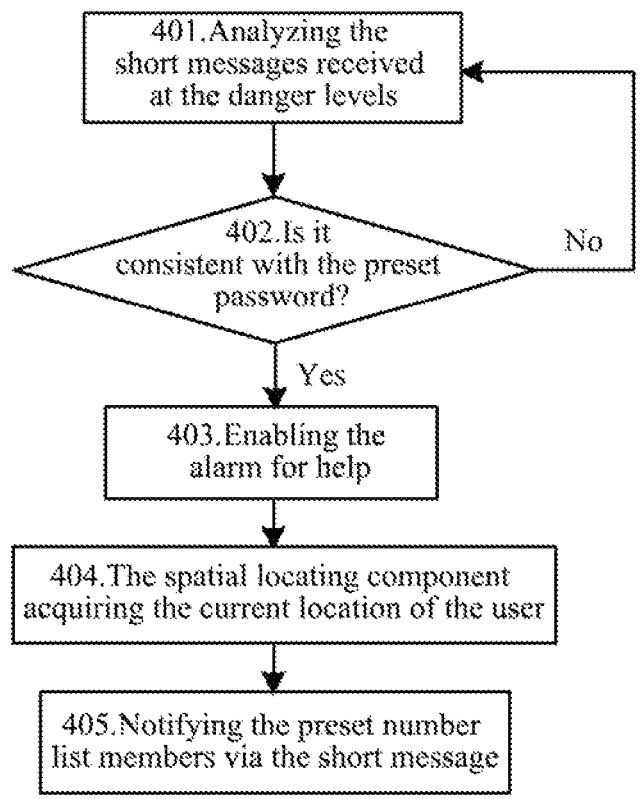
FIG. 5 is a flow chart of the other level processing by the user danger level monitoring platform.

The processing procedure at the danger level of LEVEL3 is shown in FIG. 5 and comprises the following steps.

In step 401, the short messages received at the danger level LEVEL2 and above are analyzed.

In step 402, it is judged whether the password in the short message content is consistent with the preset password or not, and if yes, step 403 is performed; otherwise step 401 is performed.

In step 403, the alarm component is enabled for help.

In step 404, the spatial locating component acquires the current location of the user.

In step 405, the acquired location is notified to the preset number list via the short message.

Figure 6:
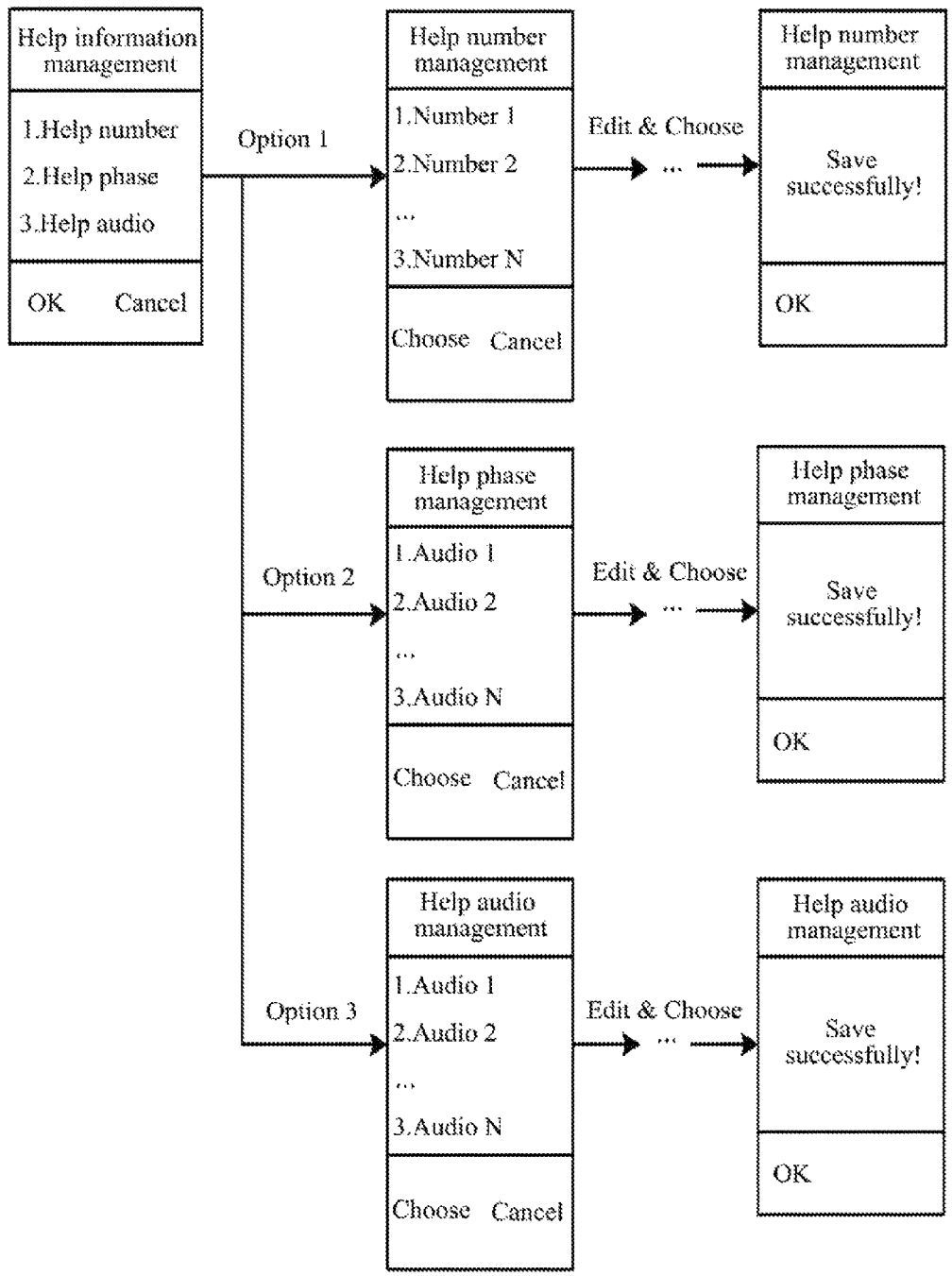
FIG. 6 is a schematic diagram of the help information management component.

The aforementioned help information management component provides the public interface for managing numbers of persons who ask for help, help phrases as well as help audio for users. FIG. 6 shows the schematic diagram of the help information management component and describes the management framework of the help information management component. The numbers of the persons who ask for help are used to store the editing and setting by the users to the help numbers; the help phrase is used in LEVEL2 to poll and dial the preset number list, and meanwhile, the short message function component sends the help short message, so that the person who is asked for help can more clearly specify the emergency degree of the incoming call; the help audio is the alarm tone invoked when triggering the alarm component at the LEVEL1 and LEVEL3. These three types of help information are provided to the users for editing and querying in the form of a menu list in the foreground, and the background can use the link for managing. After entering the main menu of the help information management, the user can respectively enter the directories of these three types of help information, select to edit and enable the entry i (i=1 . . . n), and save the information in real time to ensure flexibility in the use of the entire monitoring system.

In summary, the present invention fully considers a variety of potential crisis encountered by the elderly and sick people, and the multi-level danger monitoring system is introduced to detect and locate the danger as soon as possible, thereby ensuring the timing and effectiveness of the rescue.

The above description is only the preferred embodiments of the present invention and is not intended to limit the protection scope of the present invention.

What is claimed is:

1. A mobile terminal for implementing monitoring management comprising: a user danger level monitoring platform configured to: adapt to a monitored current situation of a user, enable a corresponding danger level, and take a corresponding rescue measure;

wherein the user danger level monitoring platform comprises: an enabling unit and a platform monitoring operating unit; wherein, the enabling unit is configured to: trigger enabling of the user danger level monitoring platform according to an enabling message received from the user danger level monitoring platform; adapt to the monitored current situation of the user, and enable the corresponding danger level;

the platform monitoring operating unit is configured to: take the corresponding rescue measure according to the enabled danger level;

wherein the user danger level monitoring platform further comprises: a fluctuation detection component configured to: detect a user motion state, and send the enabling message to the enabling unit when the user motion state has a sudden fluctuation exceeding a preset fluctuation threshold;

the enabling unit is further configured to: enable the user danger level monitoring platform; and enable a first danger level when the monitored enabling message is sent from the fluctuation detection component;

the platform monitoring operating unit further comprises: an alarm component configured to: send an alarm signal via a beep or help audio set by the user in the first danger level;

wherein the platform monitoring operating unit further comprises: a first timer component configured to be enabled at same time when enabling the alarm component to allow the user to choose to actively clear the alarm within preset time, and notify the enabling unit to enable a second danger level when the alarm has not been cleared when the preset time arrives;

wherein in the second danger level, the platform monitoring operating unit further comprises: an automatic dialing-up component configured to: dial a help number set by the user to make a call for help, and automatically establish call interaction with a party who is asked for help;

wherein the platform monitoring operating unit further comprises: a first short message function component, configured to: be enabled at the same time when enabling the automatic dialing-up component, or be enabled when using a polling way to call the help number for help and a call is unable to be established, send a preset help phrase, and establish short message interaction with the party who is asked for help;

wherein the platform monitoring operating unit further comprises: a polling times analyzer and a second timer component; wherein, the polling times analyzer is configured to: count polling times, and notify the second timer component to be enabled in a case that the polling times do not reach a preset threshold;

the second timer component is configured to: be enabled in the case that the polling times do not reach the preset threshold, and notify the automatic dialing-up component to start a new round of automatic dialing-up when set time arrives.

2. The mobile terminal of claim 1, wherein the user danger level monitoring platform further comprises: a key analysis component configured to analyze a user's key operation, and send the enabling message to the enabling unit when the analyzed user's key operation matches with a set key or key combination;

the enabling unit is further configured to enable said user danger level monitoring platform; and enable the second danger lever when the monitored enabling message is sent by the key analysis component.

3. The mobile terminal of claim 1, wherein the platform monitoring operating unit further comprises: a second short message function component configured to analyze a short message containing an authentication password from the party who is asked for help after establishing the call interaction but the party who is asked for help does not acquire user response, and when the analyzed password matches a preset danger upgrading password, notify the enabling unit to enable a third danger level;

alternatively, the platform monitoring operating unit further uses the polling times analyzer to count the polling times, and when the polling times reaches the preset threshold, notify the enabling unit to enable the third danger level.

4. The mobile terminal of claim 3, wherein in the third danger level, the platform monitoring operating unit further comprises: a spatial locating component configured to be enabled in a case of re-enabling the alarm component, and send the acquired user's current location to the parties who are asked for help corresponding to the help numbers in group.

5. A method for implementing monitoring management comprising: adapting to a monitored current location of a user, enabling a corresponding danger level, and taking a corresponding rescue measure;

before enabling the danger level, further comprising: triggering to enable the user danger level monitoring platform according to a received enabling message from the platform;

wherein when the enabling message is not triggered by the user pressing a key, a first danger level is enabled, and the taken rescue measure specifically comprise: an alarm component sending an alarm signal via beep or help audio set by the user;

wherein a first timer component is enabled at same time when enabling the alarm component, the user is allowed to choose to actively clear an alarm within preset time, and in a case that the alarm has not been cleared triggering to enable the user danger level monitoring platform, or in a case that the enabling message is triggered by the user pressing the key, a second danger level is enabled, and the taken rescue measure specifically comprise: an automatic dialing-up component calling a help number set by the user for help, and automatically establishing call interaction with a party who is asked for help;

wherein the established interaction further comprises: a first short message function component being enabled at same time when enabling the automatic dialing-up component or being enabled when using a polling way to call the help number but a call is unable to be established, sending a preset help phrase, and establishing the short message interaction with the party who is asked for help;

wherein when using the polling way to poll the help number, polling times are further counted, and in a case that the polling times do not reach a preset threshold, a second timer component is notified to be enabled, and when the set time arrives, the automatic dialing-up component is notified to start a new round of automatic dialing-up.

6. The method of claim 5 further comprising: after establishing the call interaction, a second short message function component analyzing a short message containing an authentication password from the party who is asked for help in a case that the party who is asked for help does not acquire said user response, and when the analyzed password matches with a preset danger upgrading password, enabling a third danger level;

alternatively, the method further comprising: counting the polling times, and when the polling times reach the preset threshold, enabling the third danger level.

7. The method of claim 6, wherein in the third danger level, the taken rescue measure comprises: the spatial locating component being enabled in a case of re-enabling the alarm component, and sending the acquired current location of the user to the parties who are asked for help corresponding to the help numbers according to the set help numbers.

* * * * *